United States Patent [19]

Zukowski et al.

[11] 4,310,773

[45] Jan. 12, 1982

[54] GLASS FLASH TUBE

[75] Inventors: Edward C. Zukowski, Mentor; John C. Sobieski, Richmond Heights, both of Ohio

[73] Assignee: General Electric Company, Schenectady, N.Y.

[21] Appl. No.: 39,265

[22] Filed: May 16, 1979

[51] Int. Cl.³ .................... H01J 17/16; H01J 17/06
[52] U.S. Cl. ................................. 313/221; 313/213
[58] Field of Search ............................ 313/221, 213

[56] References Cited

U.S. PATENT DOCUMENTS

| | | | |
|---|---|---|---|
| 1,449,793 | 3/1923 | Taylor | 313/221 |
| 1,964,321 | 6/1934 | Hood | 313/221 |
| 2,217,421 | 10/1940 | Scott | 313/221 X |
| 2,492,142 | 12/1949 | Germeshausen | 313/213 X |
| 2,611,883 | 9/1952 | Noel | 313/221 X |
| 3,148,300 | 9/1964 | Graff | 313/221 |
| 3,506,385 | 4/1970 | Weber et al. | 431/95 |
| 3,651,365 | 3/1972 | Waymouth | 313/221 X |
| 4,001,624 | 1/1977 | Cosco et al. | 313/221 X |

FOREIGN PATENT DOCUMENTS

| | | | |
|---|---|---|---|
| 728769 | 2/1966 | Canada | 313/213 |
| 1101612 | 3/1961 | Fed. Rep. of Germany | 313/221 |
| 1328330 | 4/1963 | France | 313/213 |
| 1014340 | 12/1965 | United Kingdom | 313/213 |

*Primary Examiner*—Robert Segal
*Attorney, Agent, or Firm*—John F. McDevitt; Lawrence R. Kempton; Philip L. Schlamp

[57] ABSTRACT

A xenon flash tube is disclosed utilizing a particular borosilicate glass for the lamp envelope which is sealed directly by hermetic seal to inleads of a metal alloy predominantly of iron, nickel and cobalt. Additionally, said flash tube employs particular electron emission means in the form of a porous sintered body of refractory metal having an electron emissive material dispersed therein. This flash tube construction can be operated at reasonably high energy loadings for an extended number of flashes without experiencing significant light output deterioration.

10 Claims, 1 Drawing Figure

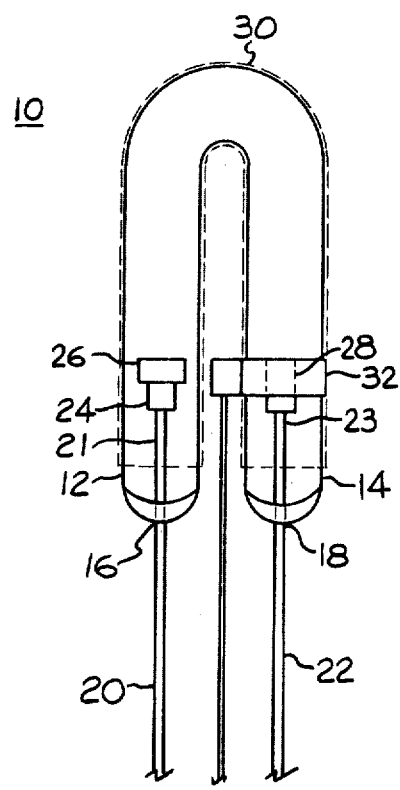

GLASS FLASH TUBE

BACKGROUND OF THE INVENTION

This invention relates generally to flash tube type electric discharge lamps and more particularly to lamps of this type which are operated at reasonably high energy loadings for extended time periods up to one million flashes and greater. Such type flash tubes generally comprise a pair of spaced apart electrodes within the sealed light-transmitting envelope having a rare gas filling, typically xenon, at subatmospheric pressures. Said discharge lamps further customarily include an auxiliary surface electrode to initiate the xenon discharge and which can be provided with a transparent metal oxide coating, such as tin oxide, being applied to the exterior surface of the sealed light-transmitting envelope. While the original light-transmitting envelopes were customarily formed from fused quartz, other glass materials including aluminosilicate glass and borosilicate glass compositions have been known for such use as well as even soft glasses if the particular lamp operating conditions are adjusted to reduce environmental stress on said glass member.

Environmental problems most frequently experienced in flash tube operation are thermal stress which can understandably lead to premature lamp failure and solarization of the glass envelope material which can lead to early discoloration with a substantial light loss over the lamp lifetime. A further problem encountered during lamp manufacture is reliability of the hermetic seal between the lamp glass material and metal alloys used to form the lamp electrical inleads. Specifically, there is a tendency for said glass-to-metal seals to be unreliable unless the thermal expansion characteristics of both materials are closely matched and any stones, knots or non-homogeneity in the glass material further tends to cause the seal to be rejected for appearance, dimensional non-conformity, or structurally weak areas. A still further problem which can impair reliable formation of a direct glass-to-metal seal is undesirable chemical reaction between the metal alloy and the glass material during the sealing procedure. Metal oxides in the glass material can be macroscopically reduced by the metal elements in the inlead alloys as a further means of contributing to seal failure or mechanical weakness in the seal. By reason of all the foregoing problems, borosilicate glass materials have not yet been employed commercially to any significant degree in flash tube constructions.

SUMMARY OF THE INVENTION

A particular borosilicate glass composition has been found which is particularly suitable for the lamp envelope material of this type flash tube construction and wherein the electrical inlead wires which are sealed directly by hermetic seal to the glass material are composed of an alloy or iron, nickel and cobalt and optionally containing minor amounts of manganese. In said novel flash tube construction, refractory metal electrodes are affixed to the inner ends of said electrical inlead wires within the lamp glass envelope and a porous sintered body of refractory metal is secured to one of said electrodes having an electron-emissive material dispersed in the pores of said porous sintered body and with said electron-emissive material being an interoxide formed between at least one alkaline earth metal selected from calcium and barium with a refractory metal.

More particularly, borosilicate glass compositions are used having the following constituents in about the range stated by weight: 60–75% $SiO_2$, 10–25% $B_2O_3$, 1–10% $Al_2O_3$, 4–10% total alkali oxide, and 0–5% BaO, except for incidental impurities with residual fluxes and refining agents. The composition of this glass material avoids undesirable chemical interaction with the metal alloy inleads during the sealing operation and matches the thermal expansion characteristic of said alloys by exhibiting a mean coefficient of linear thermal expansion between 0° and 300° C. generally in the range of 40 to $52 \times 10^{-7}$ per °C.

Suitable alloys for the inlead members of the present flash tube construction include those commercially known by the names Kovar, Rodar, Therlo, Fernico I, Fernico II, Nicoseal, Nilok, Sealvac A, and others. Customarily, these are alloys predominantly of iron, nickel and cobalt and optionally contain manganese in amounts generally less than 1%, preferably less than 0.5%, along with incidental impurities. The general range of composition of such alloys is 27 to 32% Ni, 14–19% Co, less than 1.0% Mn, the balance iron except for incidental impurities. The composition of Kovar, a suitable inlead material, is about 54% Fe, 29% Ni, 17% Co, less than 0.5% Mn, less than 0.2% Si, and less than 0.06% C. A particularly suitable glass composition providing superior glass-to-metal seals to the above defined Kovar-type metal alloys consists essentially of in ranges stated by weight 60–70% $SiO_2$, 2.5–4.5% $Na_2O$, 4.5–7.5% $K_2O$, 21–24% $V_2O_3$, 1–3.5% $Al_2O_3$, 0–1% F, and up to about 0.5% of a refining agent generally arsenic or antimony. Said glass material has been found to be readily free of such known homogeneities such as knots, cords and stones compared with previously known borosilicate glasses for sealing to Kovar-type metals. Additionally, the thermal expansion characteristics of said glass material closely match that for the Kovar-type metal alloys and with an annealing point of 485° C.

The particular electron emission means of the present flash tube construction comprises a sintered refractory metal such as a sintered tungsten or tantalum pellet with an electron emission material dispersed in the pores of said porous sintered body. Said electron emission material is of the high performance type which contains refractory metal ion so as not to experience degradation leading to significant reduction in light output of the flash tube when flashed for a considerable number of flashes as previously indicated. This electron emission material can be prepared in a conventional manner such as by firing a mixture of source materials for the alkaline earth metal and refractory metal oxides in said interoxide. A specially preferred emissive material prepared in this manner comprises 7.9 parts tungstic oxide, 3.4 parts calcium carbonate and 13.4 parts barium carbonate which are blended and fired four hours at approximately 1300° C. in air to provide an interoxide substantially devoid of the alkaline earth metal tungstate compounds. Said emission material can thereafter be utilized as a dopant in a liquid suspension to impregnate electrode pellets of the porous sintered refractory metal wherein said doped electrode pellets can thereafter be suitably dried to provide the electrode members in the present flash tube construction.

DESCRIPTION OF THE DRAWINGS

The accompanying drawing is a perspective view of a preferred glass flash tube construction employing a transparent conductive coating upon the exterior surface of the lamp envelope to permit triggering or initiation of the light producing xenon discharge.

DESCRIPTION OF THE PREFERRED EMBODIMENTS

Referring to the accompanying drawing, a double-ended tubular shaped glass flash tube 10 is shown which includes a light-transparent envelope 12 of the present glass composition in the form of an elongated closed tube 14, having a U-shaped configuration, and sealed at each end by direct hermetic sealing to the outer ends 16 and 18 of a pair of Kovar-type metal inleads 20 and 22, respectively, in the flash tube discharge assembly. The opposite inner ends 21 and 23 of said electrical inleads are secured in conventional manner to a pair of discharge electrode members 24 and 28 in said discharge assembly with said electrode members being formed of a refractory metal such as tantalum, molybdenum or tungsten. Discharge electrode 24 provides the cathode element in said discharge assembly by reason of having a porous sintered refractory metal pellet 26 conventionally secured thereto which is impregnated with the present electron emissive material. Discharge electrode 28 provides the anode element in said discharge assembly permitting ionization of a xenon filling (not shown) also contained within the closed tube 14 upon application of an electrical pulse having sufficient ionizing potential. A transparent electrically conductive coating 30 applied on the exterior surface of glass tube 14 provides starting electrode means to initiate the xenon discharge with said starting electrode means being electrically connected by electrode termination means 32 to a source of a high frequency, high voltage current in the conventional manner. As a specific example of one flash tube construction having said above described configuration and operational characteristics, there is employed a glass tube envelope with a 4 millimeter inside diameter, a 6 millimeter outside diameter, an overall length of 81 millimeters, a 55 millimeter gap spacing of the electrodes formed with a 0.75 millimeter diameter Kovar inlead wire, and a 150 torr pressure-fill of xenon. Said flash tube was operated with an electrical energy input source providing a nominal anode voltage of 350 volts dc in combination with a conventional trigger circuit providing a 3.5 Kv minimal voltage and a 7 Kv maximum voltage peak. There was exhibited a light output at the above anode voltage conditions of 4.4 lux-seconds at a four foot measurement distance. Further operation of said flash tube at a flash rate of 60 flashes per minute for 3 million flashes did not produce significant light loss from discoloration or cause crazing of the lamp glass envelope. The specific glass composition employed in said flash tube of the composition contained approximately in weight percent, as calculated from the starting batch materials: $SiO_2$ 65.1, $Na_2O$ 3.4, $K_2O$ 6.0, $Al_2O_3$ 1.5, $B_2O_3$ 23, F0.8 and 0.2 $As_2O_3$.

It will be apparent from the foregoing description to those skilled in the art that various modifications can be made within the scope of the present invention. For example, other flash tube configurations than above specifically disclosed such as a straight tube configuration for the lamp envelope are contemplated. It is intended to limit the present invention, therefore, only by the scope of the following claims.

What we claim as new and desire to secure by Letters Patent of the United States is:

1. A flash tube which comprises:
   (a) an elongated closed tube of borosilicate glass having the following constituents in about the range stated by weight: 60–75% $SiO_2$, 10–25% $B_2O_3$, 1–10% $Al_2O_3$, 4–10% total alkali oxide, and 0–5% BaO, except for incidental impurities and residual fluxes and refining agents,
   (b) electrical inlead wires sealed directly by hermetic seal at the outer ends to said glass material, said inlead wires being composed of an alloy of iron, nickel, and cobalt, and optionally containing minor amounts of manganese,
   (c) refractory metal electrodes secured to the inner ends of said electrical inlead wires,
   (d) a porous sintered body of refractory metal secured to one of said electrodes having an electron emissive material dispersed in the pores of said porous sintered body, said electron emissive material being an interoxide of at least one alkaline earth metal selected from calcium and barium with a refractory metal, and
   (e) a xenon filling in said tube whereby said flash tube can be operated at a flash rate of 60 flashes per minute without significant light loss from discoloration or crazing of the glass.

2. A flash tube as in claim 1 wherein the refractory metal constituent of said electron emissive material is tungsten ion.

3. A flash tube as in claim 1 wherein the borosilicate glass material has a mean coefficient of linear thermal expansion between 0° and 300° C. about in the range of 40 to $52 \times 10^{-7}$ per °C.

4. A flash tube as in claim 1 wherein the electrical inlead alloy consists essentially of the following constituents in about the ranges stated by weight: 27–32% Ni, 14–19% Co, less than 10% Mn, the balance iron, except for incidental impurities.

5. A flash tube as in claim 1 wherein the borosilicate glass material consists essentially of in ranges stated by weight: 60–70% $SiO_2$, 2.5–4.5% $Na_2O$, 4.5–7.5% $K_2O$, 21–24% $B_2O_3$, 1–3.5% $Al_2O_3$, 0–1% F, and up to 0.5% $As_2O_3$.

6. A flash tube as in claim 1 wherein the closed tube has a U-shaped configuration.

7. A flash tube which comprises:
   (a) an elongated closed tube of borosilicate glass material consisting essentially of in ranges stated by weight, 60–70% $SiO_2$, 2.5–4.5% $Na_2O$, 4.5–7.5% $K_2O$, 21–24% $B_2O_3$ 1–3.5% $Al_2O_3$, 0–1% F, and up to 0.5% of a refining agent, said glass material having a mean coefficient of linear thermal expansion between 0° and 300° C. about in the range of 40 to $52 \times 10^{-7}$ per °C.,
   (b) electrical inleads sealed directly by hermetic seal at the outer ends to said glass material, said inlead wires being composed of an alloy consisting essentially of iron, nickel and cobalt, and optionally containing minor amounts of manganese,
   (c) molybdenum electrodes secured to the inner ends of said electrical inlead wires,
   (d) a porous sintered body of refractory metal secured to one of said electrodes having an electron emissive material dispersed in the pores of said porous sintered body, said electron emissive material being an interoxide of calcium and barium with a refractory metal, and (e) a xenon filling at a pressure of about 150 torr in said tube whereby said flash tube can be operated at a flash rate of 60 flashes per minute without significant light loss from discoloration or crazing of the glass.

8. A flash tube as in claim 7 wherein the refractory metal constituent of said electron emissive material is tungsten ion and the porous sintered body is tantalum.

9. A flash tube as in claim 7 wherein the electrical inlead alloy consists essentially of the following constituents in about the ranges stated by weight: 27–32% Ni, 14–19% Co, less than 1.0% Mn, the balance iron, except for incidental impurities.

10. A flash tube as in claim 7 wherein the closed tube has a U-shaped configuration.

* * * * *